United States Patent
Bashkirov

(10) Patent No.: US 11,340,696 B2
(45) Date of Patent: May 24, 2022

(54) EVENT DRIVEN SENSOR (EDS) TRACKING OF LIGHT EMITTING DIODE (LED) ARRAY

(71) Applicant: Sony Interactive Entertainment Inc., Tokyo (JP)

(72) Inventor: Sergey Bashkirov, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/741,051

(22) Filed: Jan. 13, 2020

(65) Prior Publication Data

US 2021/0216136 A1    Jul. 15, 2021

(51) Int. Cl.
| | |
|---|---|
| *G06F 3/00* | (2006.01) |
| *G06F 3/01* | (2006.01) |
| *G01S 5/16* | (2006.01) |
| *G06F 3/03* | (2006.01) |

(52) U.S. Cl.
CPC ............... *G06F 3/012* (2013.01); *G01S 5/16* (2013.01); *G06F 3/0325* (2013.01)

(58) Field of Classification Search
CPC ........... G06F 3/012; G06F 3/0325; G01S 5/16
See application file for complete search history.

(56) References Cited

U.S. PATENT DOCUMENTS

| | | | |
|---|---|---|---|
| 2004/0227820 A1 | 11/2004 | Nister | |
| 2010/0232709 A1* | 9/2010 | Zhang | ....................... G06T 7/77 382/201 |
| 2014/0126769 A1* | 5/2014 | Reitmayr | .................. G06T 7/73 382/103 |
| 2014/0320593 A1 | 10/2014 | Pirchheim et al. | |
| 2015/0253428 A1 | 9/2015 | Holz | |
| 2017/0124712 A1* | 5/2017 | Liu | ........................ G06K 9/209 |
| 2017/0147088 A1 | 5/2017 | Martinez et al. | |
| 2017/0292841 A1 | 10/2017 | Sabe et al. | |
| 2018/0268237 A1* | 9/2018 | Stanimirovic | ........ G06K 9/2018 |
| 2019/0073825 A1* | 3/2019 | Lee | .......................... G06T 17/00 |

(Continued)

FOREIGN PATENT DOCUMENTS

| | | | |
|---|---|---|---|
| CN | 105869136 A | * | 8/2016 |
| CN | 106127739 A | * | 11/2016 |

OTHER PUBLICATIONS

Censi, Andrea, et al. "Low-latency localization by Active LED Markers tracking using a Dynamic Vision Sensor." 2013 IEEE/RSJ International Conference on Intelligent Robots and Systems. IEEE, 2013. pp. 891-898.*

(Continued)

*Primary Examiner* — Sarah Lhymn
(74) *Attorney, Agent, or Firm* — John L. Rogitz

(57) ABSTRACT

An event driven sensor (EDS) is used for simultaneous localization and mapping (SLAM) and in particular is used in conjunction with a constellation of light emitting diodes (LED) to simultaneously localize all LEDs and track EDS pose in space. The EDS may be stationary or moveable and can track moveable LED constellations as rigid bodies. Each individual LED is distinguished at a high rate using minimal computational resources (no image processing). Thus, instead of a camera and image processing, rapidly pulsing LEDs detected by the EDS are used for feature points such that EDS events are related to only one LED at a time.

6 Claims, 8 Drawing Sheets

(56) References Cited

U.S. PATENT DOCUMENTS

| | | | |
|---|---|---|---|
| 2019/0250631 A1* | 8/2019 | Nariyambut Murali | ................... G06T 7/246 |
| 2019/0355138 A1 | 11/2019 | Hall et al. | |
| 2020/0158517 A1* | 5/2020 | Tadi | ....................... G01C 21/32 |
| 2020/0327683 A1* | 10/2020 | Yang | ......................... G06T 7/33 |
| 2021/0019526 A1* | 1/2021 | Sinclair | ................ G06T 1/0021 |

OTHER PUBLICATIONS

Davison, A.J., Reid, I.D., Molton, N.D. and Stasse, O., 2007. MonoSLAM: Real-time single camera SLAM. IEEE transactions on pattern analysis and machine intelligence, 29(6), pp. 1052-1067.*
Search Report and Written Opinion dated Mar. 31, 2021, from the counterpart PCT application PCT/US21/12760.

* cited by examiner

MONOCULAR SLAM INITIALIZATION

EVENT DRIVEN SENSOR (EDS) TRACKING OF LIGHT EMITTING DIODE (LED) ARRAY

FIELD

The application relates generally to technically inventive, non-routine solutions that are necessarily rooted in computer technology and that produce concrete technical improvements.

BACKGROUND

Simultaneous localization and mapping (SLAM) maps can be useful to help autonomous robots navigate about a room or building, and to also help users navigate about a room or building when wearing an augmented reality (AR) head mounted display (HMD). For example, and as understood herein, to properly present virtual reality (VR) images on the HMD and for other reasons, AR HMD systems must among other things track the pose of the HMD, the hands of the wearer, and other real-world objects typically using SLAM principles.

This is processing-intensive and consumes considerable battery power and computational resources in the HMD. Furthermore, conventional SLAM techniques must account for the fact that feature points identification is not absolute. It is therefore possible to mismatch features. Due to that, various techniques are used to protect tracking from failure. For example, these include RANSAC outlier rejection, using a loss function in optimization, and a multi-step frame match verification.

SUMMARY

To address the challenges noted herein, present principles use event driven sensor (EDS) sensing cells which detect motion by virtue of EDS principles. EDS uses the change of light intensity as sensed by one or more pixels as an indication of motion. Thus, an EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

Using present techniques combining pulsing light emitting diodes (LED) and detecting the pulses with EDS, very little computational power is required to detect feature points and the need to protect tracking from failure is eliminated, as each LED pulses at a precisely known time. By comparing the event time and LED blink times it is possible to determine which LED the event is related to. A SLAM algorithm may be executed using the output of the EDS using one step optimization such as a Kalman Filter, reducing power consumption.

LEDs are arranged in an array and briefly activated one LED at a time, e.g., for a few microseconds. The EDS event threshold is high enough to detect only LED-caused "+" or "−" events. Because only one LED is activated and deactivated at a time and because the EDS provides an exact event time stamp, resolving which event corresponds to which LED is straightforward. The LED array may be stationary and the EDS moving, or the EDS may be stationary and the LED array moving.

Because the EDS detects only intensity changes very short pulses can be used to track (and resolve which LED is which) a large number of LEDs at a time with very high frequency, e.g., greater than one thousand detections of each LED per second.

For movable EDS implementations a SLAM-like example solution is provided. In this case all "features" are distinct and there is no need for image processing and feature comparison or implementations of a loss function. For movable LED implementations an HMD pose tracking solution example is provided.

Accordingly, in a first aspect a system includes at least one light emitting diode (LED) assembly configured to cause individual LEDs in the assembly to emit light one LED at a time. The system also includes at least one event driven sensor (EDS) configured to output signals representing changes in illumination intensity responsive to LED emissions. The system further includes at least one processor configured with instructions to generate simultaneous localization and mapping (SLAM) information based at least in part on the signals from the EDS.

In some implementations, the EDS is moveable, and the LED assembly is stationary. In other implementations the EDS is not moveable, and the LED assembly is moveable. In still other implementations the EDS and LED assembly are both moveable.

In example embodiments the EDS is a first EDS and the system includes a second EDS to facilitate the processor determining stereo SLAM. In other embodiments the EDS is a first EDS and the processor receives information only from the first EDS and no other EDS to determine monocular SLAM. In this latter case, the processor can be configured with instructions to determine initial triangulation and pose estimation at least in part by receiving at least first and second frames from the EDS generated using plural events from different LEDs, determining, from the first and second frames, a fundamental matrix, computing an essential matrix from the fundamental matrix and decomposing the essential matrix into four motion hypotheses, selecting a first one of the four motion hypotheses based on the first motion hypothesis having no outliers, and using the first motion hypothesis execute SLAM by triangulating new LED positions using the first motion hypothesis as a reference.

In another aspect, a method includes energizing plural lamps one at a time and detecting events from energizing the lamps using an even detector sensor (EDS). The method includes using output of the EDS to generate simultaneous localization and mapping (SLAM) information in an augmented reality (AR) environment.

In another aspect, a system includes at least one head-mounted display (HMD) configured for presenting virtual reality (VR) images while permitting a wearer of the HMD to view at least a first real world object through the HMD. The system also includes at least one constellation of individually energizable lamps, and at least one event driven sensor (EDS) configured to generate signals representing events caused by activation of the lamps to determine at least a pose of the HMD and/or a location of the first real world object.

The details of the present application, both as to its structure and operation, can best be understood in reference to the accompanying drawings, in which like reference numerals refer to like parts, and in which:

DETAILED DESCRIPTION

Figure 1:
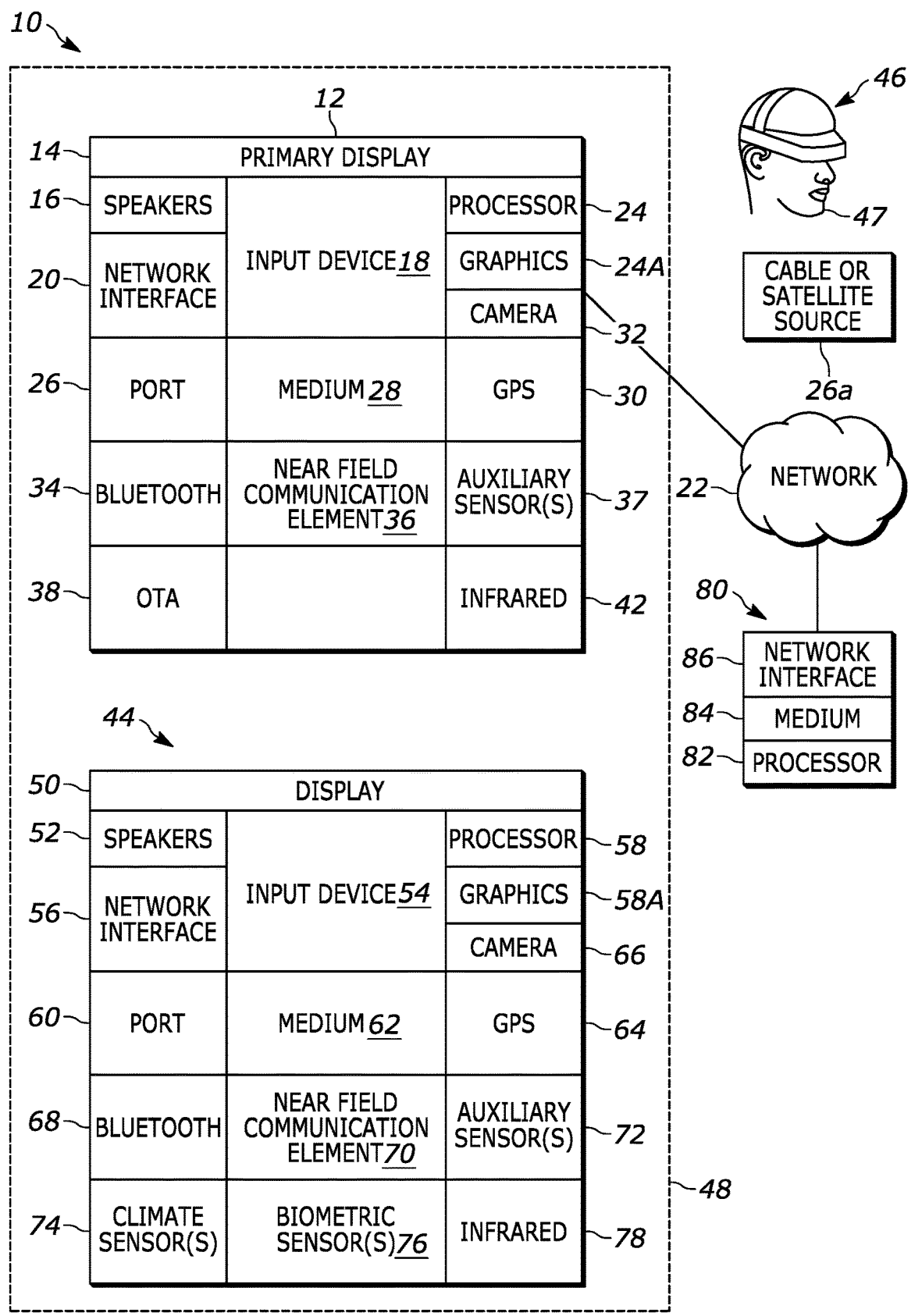
FIG. 1 is a block diagram of an example system including an example in accordance with present principles.

This disclosure relates generally to computer ecosystems including aspects of consumer electronics (CE) device networks such as but not limited to computer simulation networks such as computer game networks as well as standalone computer simulation systems. Devices and components herein may communicate in a network using so-called "5G" and thus one or more transceivers herein may be 5G transceivers. 5G is a digital cellular communications technology that enables wireless data communication in the hundreds of megabits to the gigabit range per second. Compared to earlier technology, 5G has much higher data throughput, lower power consumptions, and is less error prone. Because very large amounts of data can be wirelessly communicated from end user devices to cloud servers using 5G, present principles recognize that much more computing now performed on local devices can be offloaded to faster, more powerful cloud servers than has been heretofore practical, including the processing of computer games. 5G is described at present in the International Telecommunication Union's IMT-2020 standard, as well as 5G New Radio (5G NR) proposed by the industry standards group 3GPP. Aspects of 5G also are described in the Institute of Electrical and Electronics Engineers (IEEE) 1914 series.

A system herein may include server and client components, connected over a network such that data may be exchanged between the client and server components. The client components may include one or more computing devices including game consoles such as Sony PlayStation® or a game console made by Microsoft or Nintendo or other manufacturers of virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be a single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24 including. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignation purposes described further below. The source 26a when implemented as a game console may include some or all of the components described below in relation to the CE device 44.

The AVD 12 may further include one or more computer memories 28 such as disk-based or solid state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as an AR head-mounted display (HMD) worn by a player 47 as shown. In the example shown, only two CE devices 44, 46 are shown, it being understood that fewer or greater devices may be used.

In the example shown, to illustrate present principles all three devices 12, 44, 46 are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller, and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12 and/or a game console, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm", and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

The methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

Figure 2:
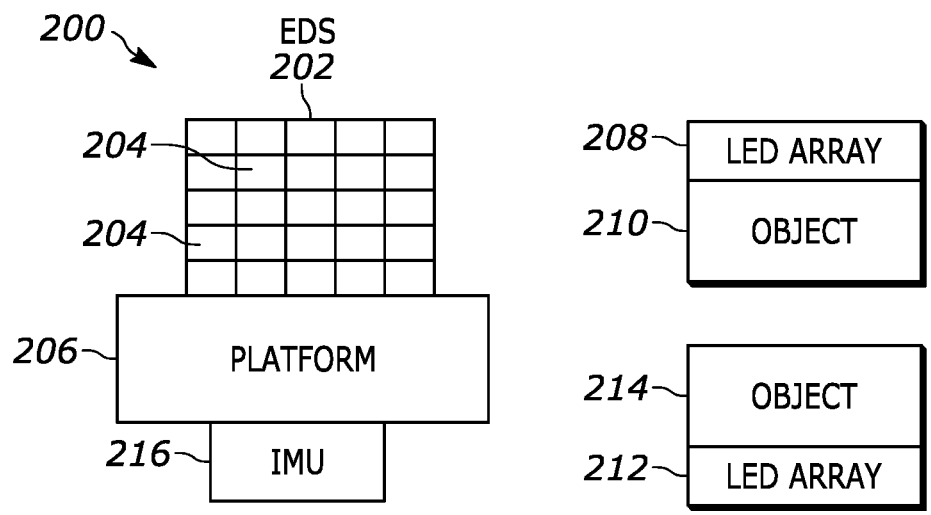
FIG. 2 is a block diagram of an example monocular SLAM system.

Now referring to FIG. 2, in a first example a monocular simultaneous localization and mapping (SLAM) arrangement 200 is shown in which one and only one EDS 202 with a matrix of sensing pixels 204 is mounted on a platform 206 such as the HMD 46 shown in FIG. 1 to detect events caused by activation and deactivation of individual lamps in an array or constellation 208 of lamps. The lamps may be light emitting diodes (LED) and the array or constellation 208 may be mounted on or otherwise engaged with a real-world object 210. As shown in FIG. 2 additional lamp arrays or constellations 212 may be similarly associated with additional objects 214. The real-world object 210 may be, without limitation, a hand of a wearer of the HMD 46, a game controller wielded by the wearer of the HMD, or other real-world object including other people in, for example, an AR computer simulation. Accordingly, the configuration of a lamp array or constellation may conform to the particular object with which it is engaged, e.g., with an LED at each finger joint of a hand or body joint of a person. If desired, an inertial monitoring unit (IMU) 216 may be associated with the EDS 202 for purposes discussed elsewhere herein. The IMU 216 may include, by way of example only, one or more of gyroscopes, accelerometers, magnetometers.

With this arrangement, the output signals of the EDS are used for simultaneous localization of all LEDs and tracking EDS pose in space. In the case of a stationary EDS and moveable LED constellations discussed further below, the relative positions of the LEDs are assumed to be determined previously and the entire constellation 208 is tracked as a rigid body.

Figure 3:
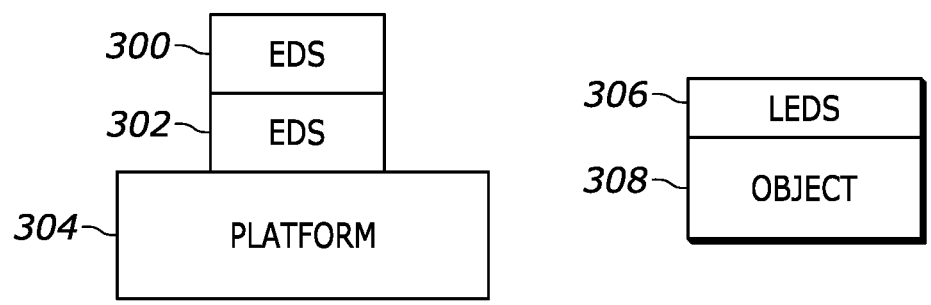
FIG. 3 is a block diagram of an example stereo SLAM system.

FIG. 3 illustrates an alternate embodiment in which stereo SLAM is provided by using the combined outputs of first and second EDS 300, 302 that may be coupled to the same platform 304 if desired to detect events from LEDs 306 on an object 308. In the case of stereo SLAM there is no need for the below-described initialization. LED positions in three dimensions are triangulated using stereo parallax. One benefit of stereo SLAM is the ability to determine relative LED positions in three dimensions with no EDS movements, as stereo parallax is used for this purpose.

Figure 4:
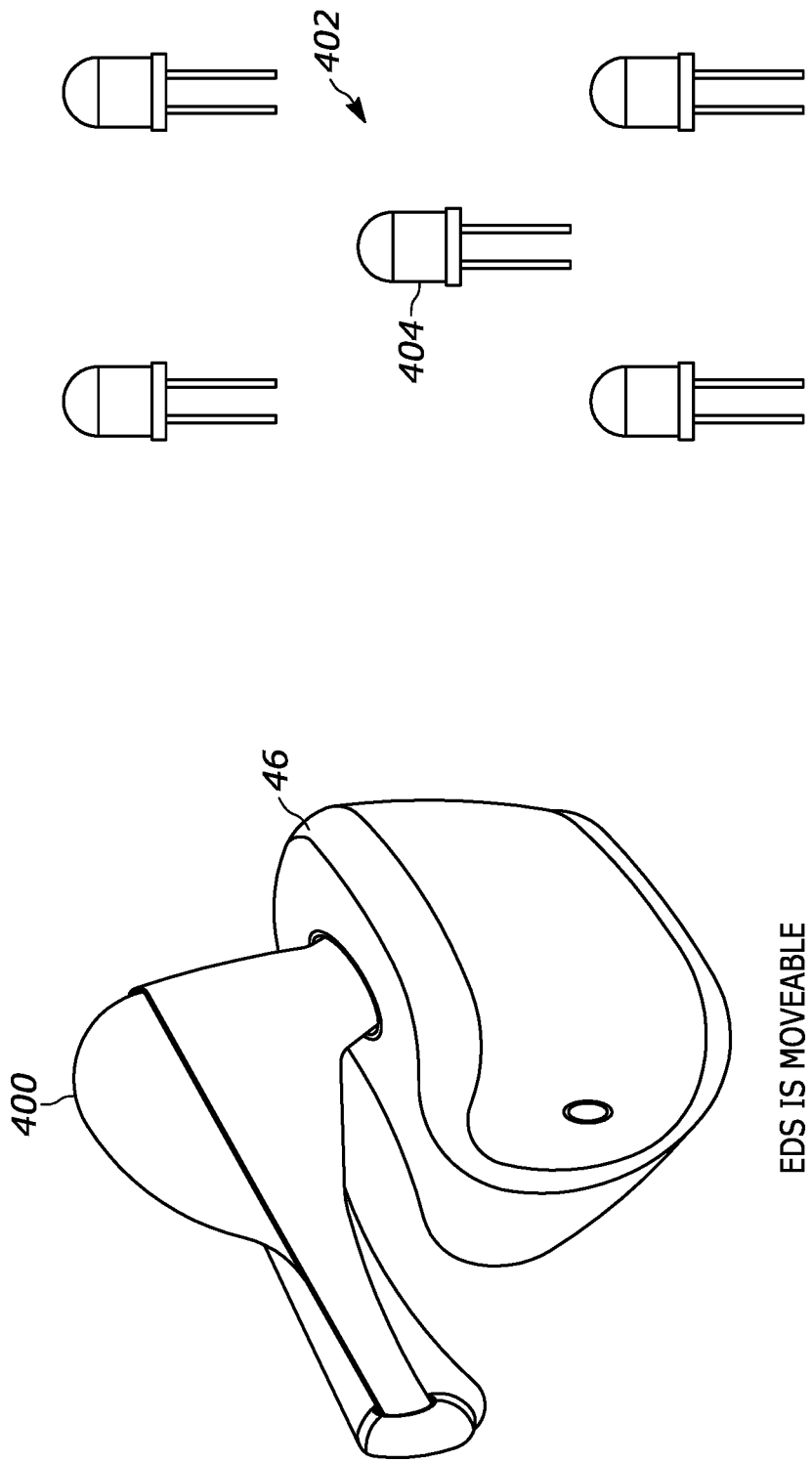
FIG. 4 is a schematic diagram of a system in which the EDS is moveable, and the LEDs are stationary.
Figure 5:
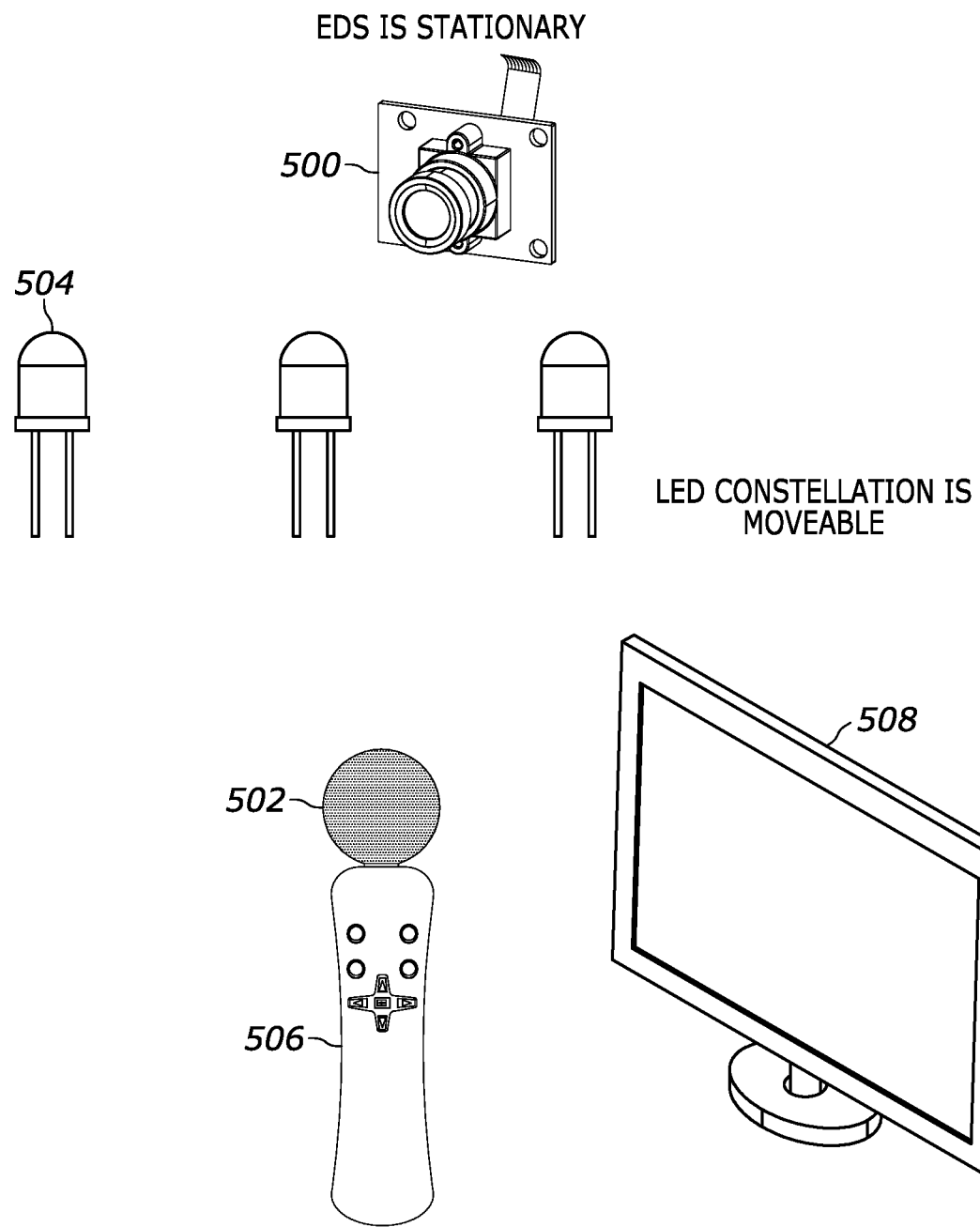
FIG. 5 is a schematic diagram of a system in which the EDS is stationary, and the LEDs are moveable.

FIG. 4 illustrates an EDS assembly 400 that contains an EDS coupled to a platform such as the HMD 46. In this case, the EDS is movable, while a constellation 402 of LEDs 404 are fixedly engaged with non-moving objects. In contrast, in FIG. 5 an EDS 500 is stationarily mounted, e.g., on a wall or other surface, while a constellation 502 of LEDs 504 is mounted on a movable object 506 such as a hand-held controller or remote-control device for a display 508. Note that in addition to being movable by virtue of being mounted on a movable object 506, the constellation 502 may be movably mounted on the object 506 itself, e.g., rotatably mounted.

Figure 6:
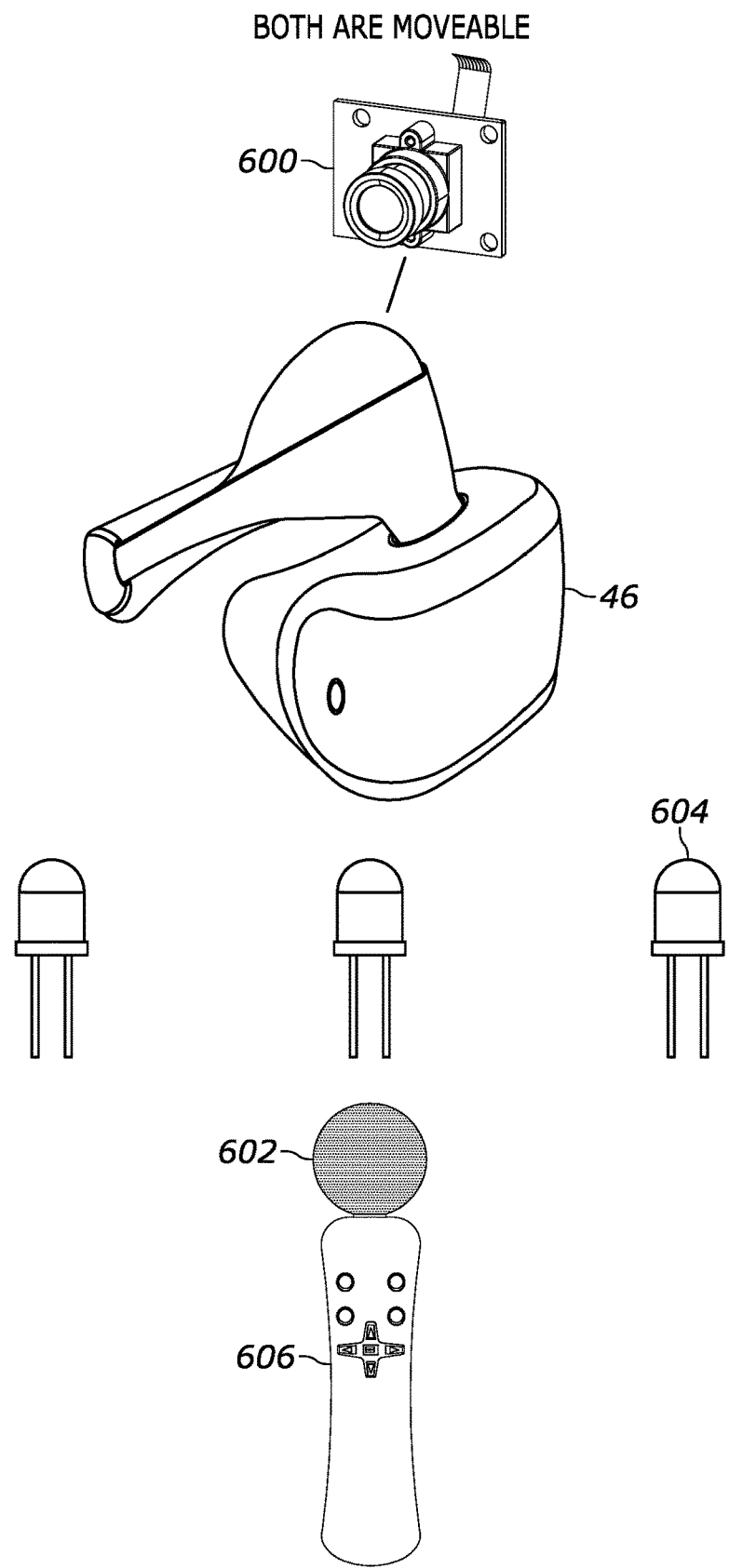
FIG. 6 is a schematic diagram of a system in which the EDS and the LEDs are moveable.

FIG. 6 on the other hand illustrates an embodiment in which an EDS 600 can be moving in the real world reference frame (e.g., by being coupled to the HMD 46) and a constellation 602 of LEDs 604 likewise can be movable by virtue of being coupled to a movable object 606. There is no need in requiring the EDS to be fixed if tracking is happening in the EDS reference frame.

In any case, tracking itself is an application of further disclosure below, describing techniques for distinguishing each individual LED at very high rates, expending very little to no computational resources (no image processing) to determine on the image plane which LED is which. As mentioned herein, tracking might be either SLAM-like (HMD 46 with EDS is moveable, LEDs are stationary but with unknown locations) or controller-like (LED constellation is tracked in EDS reference frame). There might be mixtures of these two such as HMD pose tracking plus controller location tracking relative to the headset, or HMD pose tracking in a premapped (LED positions are already known) environment. All these tracking examples have one thing in common. It is necessary to identify feature points in the environment and to reliably know which feature point is which for tracking to work. Present techniques omit a camera and image processing and instead use rapidly pulsing LEDs for feature points, detecting those pulses with EDS. It should be noted that an EDS has no formal concept of frames, reporting event positions and times when the events happens, although collectively event reports from a round of LED energizations or activations may be regarded as a "frame".

More specifically, an EDS continuously monitors each individual pixel light intensity, and if this intensity change rate over time is above a threshold, the EDS generates an event related to that particular pixel X,Y coordinates. It is possible to collect events within some time window and on that basis generate artificial "frames".

Figure 7:
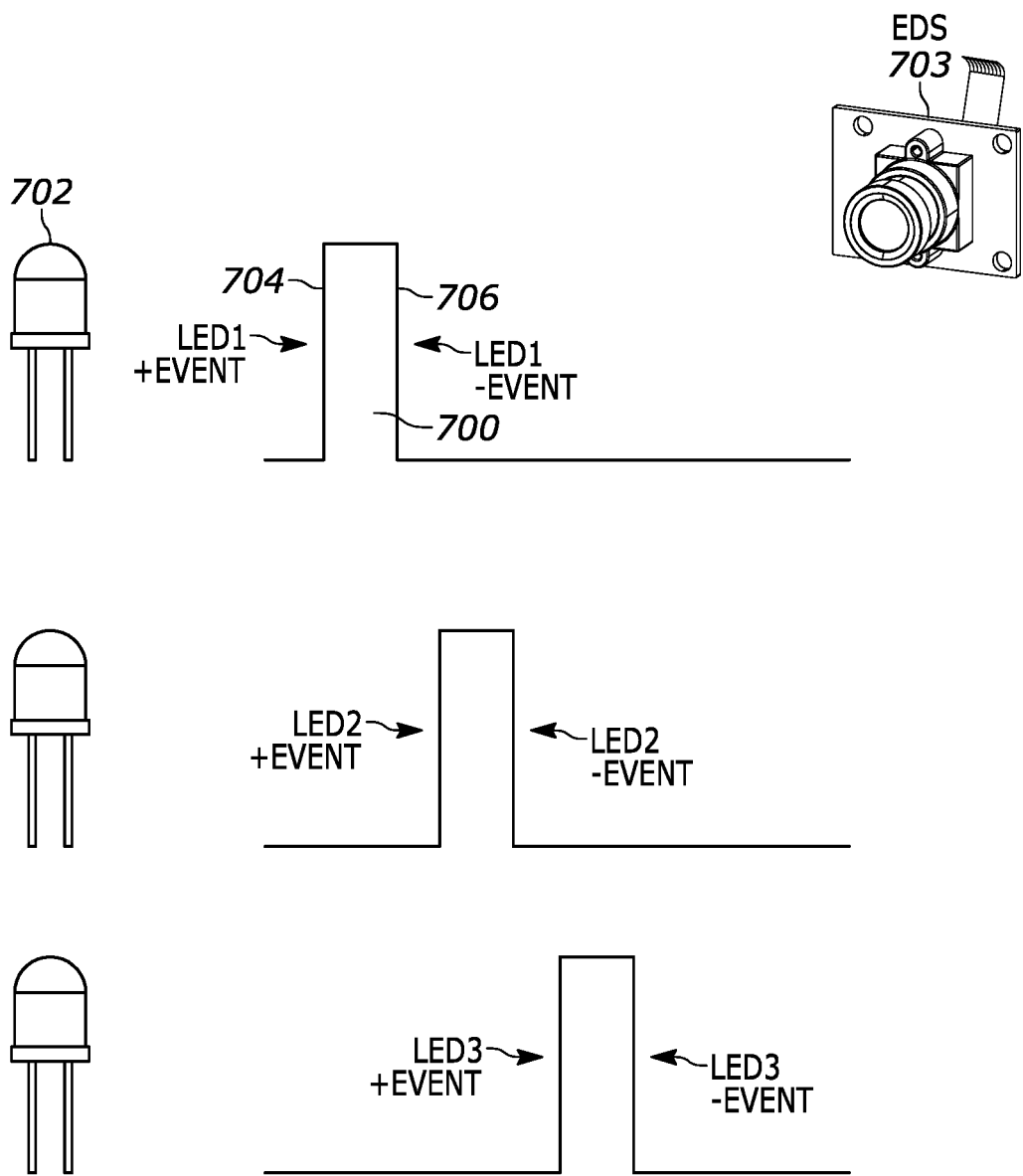
FIG. 7 illustrates one-at-a-time activation of the LEDs.

FIG. 7 illustrates. As indicated by the time-staggered pulses 700, only one LED 702 is turned on or off at a time. The timing of these pulses and which LED emits each time is established in advance and thus is known. A positive event is detected by the EDS 703 from the leading edge 704 of each pulse 700, i.e., when the LED is activated, while a negative event is detected by the EDS from the trailing edge 706 of each pulse 700, i.e., when the LED is deactivated. As shown, the leading edge of a pulse 700 is later in time than the trailing edge of the immediately preceding pulse. The EDS threshold is set high enough to detect only these LED instant intensity changes. Because of the time separation of the pulses 700, resolving which event corresponds to which LED is simplified. Due to very high EDS speed a large number of LEDs can be quickly tracked.

For each event detected by the EDS, the time of event detection and the x and y coordinates in the EDS pixel array corresponding to the event are obtained. Due to each LED on/off times being known it is determined which LED caused each particular event.

Figure 8:
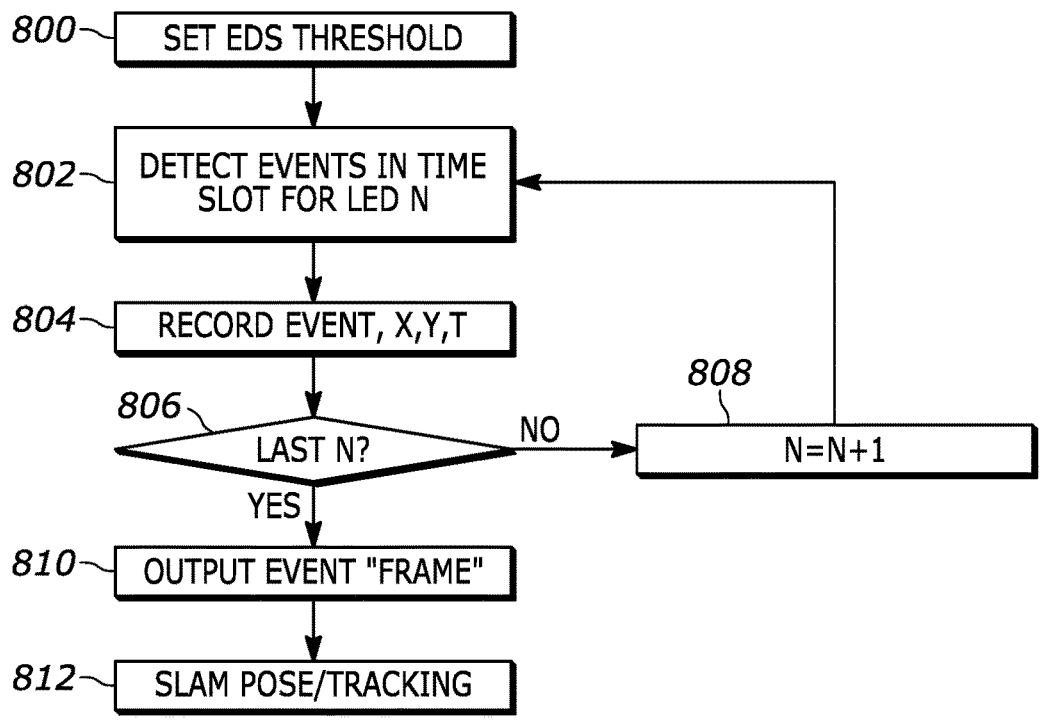
FIG. 8 is a flow chart of example logic consistent with present principles.

FIG. 8 illustrates example logic. Commencing at block 800, the event detection threshold for the EDS is established to be sufficiently high to ignore relatively small events (i.e., relatively small changes in light intensity) while being sufficient to detect the relatively large changes in light intensity caused by activation and deactivation of the LEDs.

Moving to block 802, for any particular $LED_N$, e.g., for $LED_1$ initially, at least one and typically two events (plus and minus) are detected and the EDS generates an event detection signal accordingly. For each event the time of event detection and x-y location of the event as sensed by the EDS pixel array is recorded at block 804.

States 806 and 808 simply indicate that this process is repeated until an entire "frame" of events has been detected, e.g., until one round of events from all known LEDs has been detected. If not, all LEDs have been detected at decision diamond 806, block 808 indicates that the next LED is monitored for (conceptually using flow chart format) by setting N=N+1 and then looping back to block 802. Once sufficient events have been detected and recorded, the logic may move to block 810 to output an artificial "frame" of events which may be sent to a processor at block 812 to determine SLAM pose/tracking of objects such as the HMD 46 and other real world objects based on the events, analogous to executing SLAM pose/tracking based on camera images. Stated differently, events are accumulated during a time interval within which all LEDS blink once. The events detected by the EDS are used in tracking.

Figure 9:
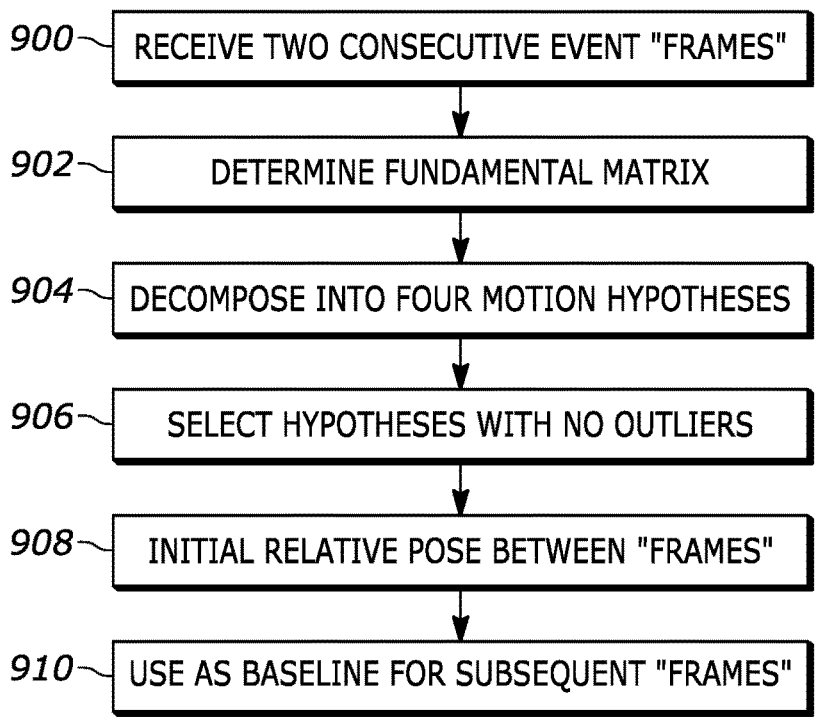
FIG. 9 is a flow chart of example monocular SLAM initialization logic consistent with present principles.
Figure 10:
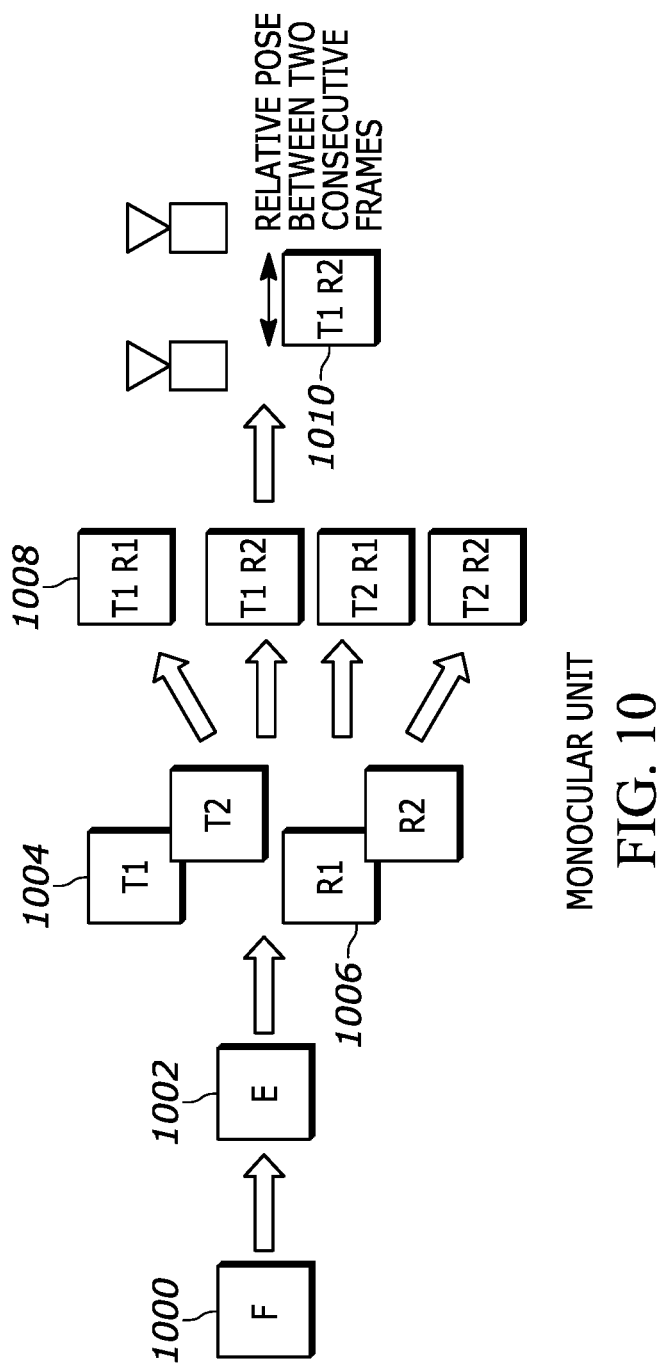
FIG. 10 is a schematic illustration of the monocular SLAM initialization.

Refer now to FIGS. 9 and 10 for the case of monocular SLAM initial triangulation and pose estimation. At block 900 a few consecutive video-like "frames" (e.g., two) are generated using a few events from different LEDs close in time. Moving to block 902 in FIG. 9, a fundamental matrix 1000 (FIG. 10) is computed based on LED correspondences between the "frames". In this case there is no need for outlier rejection as it is known which LED is which.

Proceeding to block 904 in FIG. 9, the fundamental matrix 1000 is converted to an essential matrix. The essential matrix is decomposed into four motion hypotheses. This may be done using an essential matrix 1002 which is defined by:

Essential matrix $E=K^TFK$, where K is an intrinsic parameters matrix and F is the fundamental matrix. A Singular Value Decomposition of the essential matrix is computed as E: U,V=svd(E). From this are derived (block 904 in FIG. 9) two translation hypotheses 1004 (shown in FIG. 10) given by: $T_{1,2}=+/-U_{0.2, \ 2}$ (Last column of U) and two rotation hypotheses 1006 given by $R_1=U*W*V^T$, $R_2=U*W^T*V^T$, where $$W = \begin{bmatrix} 0 & 1 & 0 \\ 1 & 0 & 0 \\ 0 & 0 & 1 \end{bmatrix}$$

LED positions in three dimensions are triangulated using each combination 1008 of the four hypotheses and projected back on to image planes. Among the four hypotheses 1008 there will be only one (indicated at 1010 in FIG. 10) with no outliers. This one is selected at block 906 in FIG. 9 and used as true one for an initial relative pose indication between the two frames at block 908. After this initialization SLAM can work in regular way by triangulating new LED positions as those appear on at least two generated "frames" at block 910. "Frame" poses are determined by using projections of LEDs with known poses. Bundle optimization can be used to refine both LED 3d positions and EDS poses.

Figure 11:
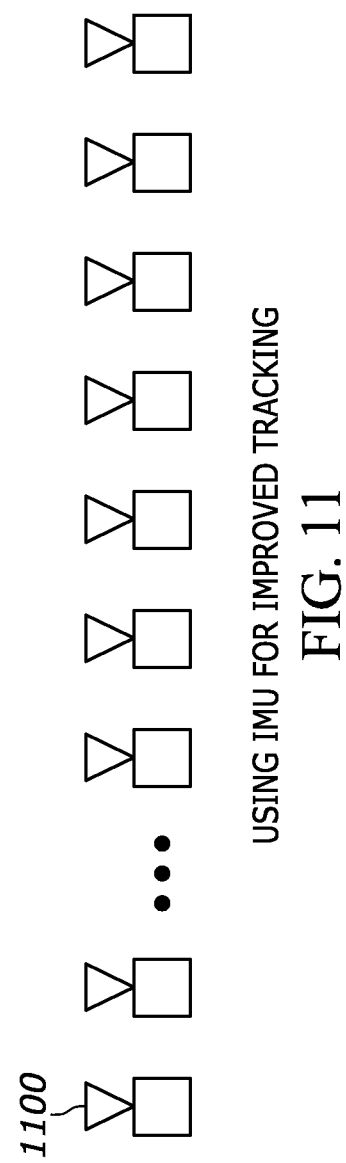
FIG. 11 is a schematic illustration of using an inertial measurement unit (IMU) in cooperation with the EDS to improve tracking.

FIG. 11 illustrates use of an IMU in conjunction with the EDS to improve tracking similar to using IMU to improve SLAM tracking based on camera images. IMU readings are integrated between frames and used to refine the overall scale and current velocity of real-world physical objects. For both monocular and stereo SLAM, IMU is used to determine a true orientation with respect to vertical. Acceleration and angular velocity are integrated between consecutive frames. Angular velocity integral represents an estimation for orientation change. The symbols 1100 in FIG. 11 represent integrals of IMU signals. A first integral of acceleration represents velocity change plus free fall gravity. The second integral of accelerometer represents a position change plus free fall gravity integral. These (IMU integrals) are additional constraints which refine movement.

A similar setup can be used for tracking movable LEDs with fixed EDS. A constellation of LEDs can be used for this purpose. Given two dimensional LED projections onto an EDS image plane, the constellation pose in three dimensions can be determined. Prior to usage the LED constellation requires calibration to determine exact LED relative positions.

In the same way, IMU may additionally be used in order to improve tracking in the case of occlusions and for the cases when less than three LEDs are observable simultaneously. For this particular tracking type, a one-step optimization method like a Kalman Filter may be used. For SLAM Levenberg-Marquardt may be used.

There are 3d pose recovery methods which use two dimensional to three-dimensional point correspondences for rigid body tracking. Normally a solution obtained from 2d-3d point correspondence is used to initiate a Kalman Filter based tracking. Kalman Filter tracking needs an initialization because a Kalman Filter is a one-step refinement gradient method and may not converge to a true solution with initial approximation being too far. As soon as any observation is available it is fed through a Kalman Filter. The Kalman filter runs two steps: a prediction step and a correction step. The prediction step evolves the system model up to an observation time, whereas the correction step adjusts the result of the previous step (the system state) to make the probability of the observation larger. Given a large number of observations constantly arriving this continuously refines the system state and makes it close to a true one.

Nonlinear optimization can be applied to all at once. Inputs are landmark observations and inertial observations and outputs are EDS consecutive poses and landmark three dimensional positions.

It will be appreciated that whilst present principals have been described with reference to some example embodiments, these are not intended to be limiting, and that various alternative arrangements may be used to implement the subject matter claimed herein.

What is claimed is:

1. A system comprising:
    at least one light emitting diode (LED) assembly configured to cause individual LEDs in the assembly to emit light one LED at a time;
    at least one event driven sensor (EDS) configured to output signals representing changes in illumination intensity responsive to LED emissions; and
    at least one processor configured with instructions to:
    determine initial triangulation and pose estimation at least in part by:
    receive at least first and second frames from the EDS generated using plural events from different LEDs;
    determine, from the first and second frames, a fundamental matrix;
    compute an essential matrix from the fundamental matrix;
    decompose the essential matrix into four motion hypotheses;
    select a first one of the four motion hypotheses based on the first motion hypothesis having no outliers; and
    use the first motion hypothesis execute simultaneous localization and mapping (SLAM) by triangulating new LED positions using the first motion hypothesis as a reference.

2. The system of claim 1, wherein the EDS is moveable, and the LED assembly is stationary.

3. The system of claim 1, wherein the EDS is not moveable, and the LED assembly is moveable.

4. The system of claim 1, wherein the EDS and LED assembly are both moveable.

5. The system of claim 1, wherein the EDS is a first EDS and the system comprises a second EDS to facilitate the processor determining stereo simultaneous localization and mapping (SLAM).

6. The system of claim 1, wherein the EDS is a first EDS and the processor receives information only from the first EDS and no other EDS to determine monocular simultaneous localization and mapping (SLAM).

* * * * *